UNITED STATES PATENT OFFICE.

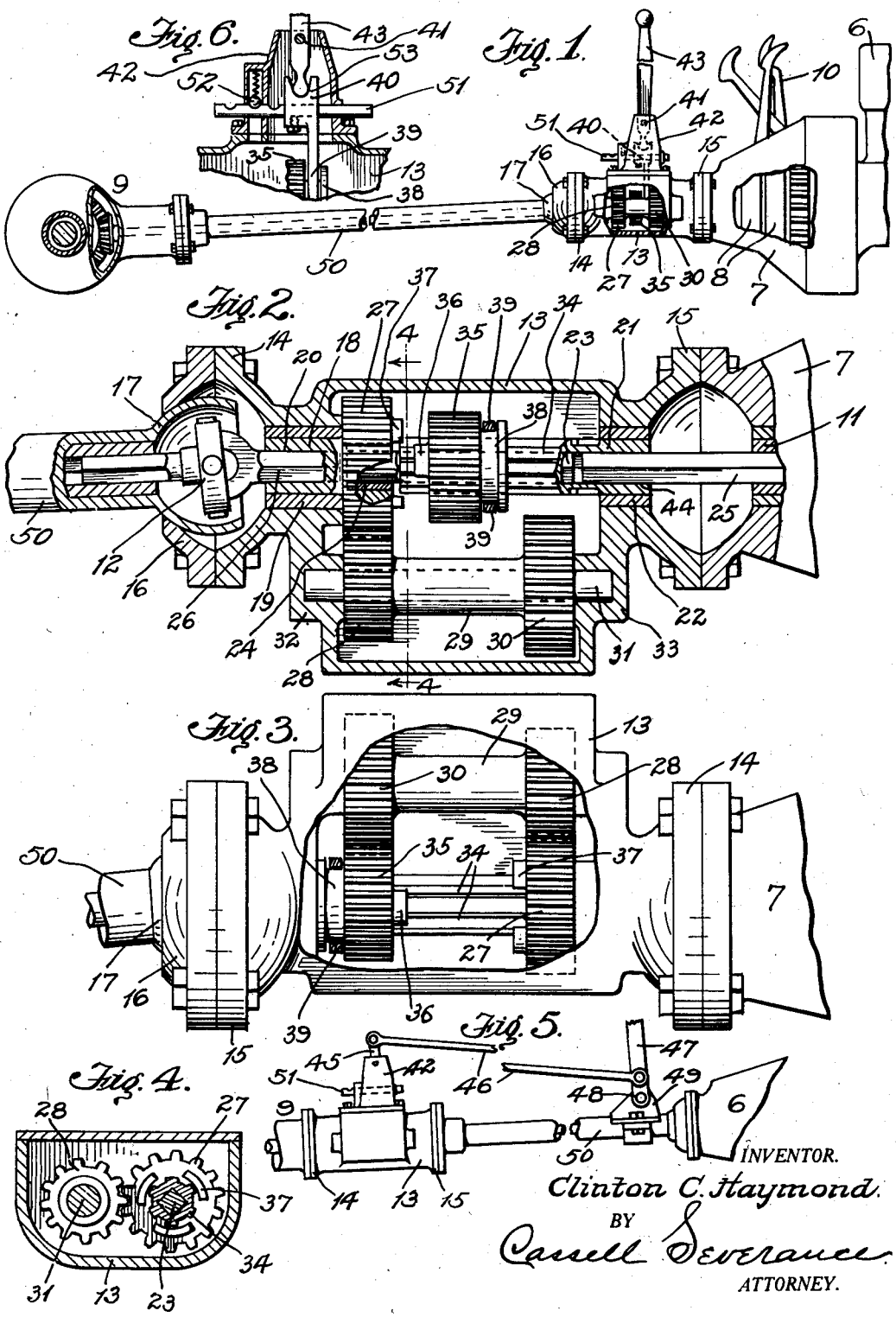

CLINTON C. HAYMOND, OF LOS ANGELES, CALIFORNIA, ASSIGNOR TO WALTER A. ROWE, OF SAN FRANCISCO, CALIFORNIA, AND GIDEON J. WOODWARD, OF LOS ANGELES, CALIFORNIA.

REVERSIBLE CHANGE-SPEED MECHANISM.

1,265,196.  Specification of Letters Patent.  Patented May 7, 1918.

Application filed June 7, 1917. Serial No. 173,398.

*To all whom it may concern:*

Be it known that I, CLINTON C. HAYMOND, a citizen of the United States, residing at Los Angeles, in the county of Los Angeles and State of California, have invented certain new and useful Improvements in Reversible Change-Speed Mechanism, of which the following is a specification.

This invention relates to improvements in auxiliary transmission mechanism or change-speed devices for use with the ordinary transmission employed on motor vehicles, motor boats, or the like.

It is an object of the invention to provide a transmission mechanism with an auxiliary change speed element, which is capable of being reversed or changed from one position to the other bodily without interfering with the motor and the power shaft for driving the differential, the said element being turned end for end in its position, whereby either a lower speed than the vehicle formerly had may be obtained, or a higher speed than the vehicle formerly had may be obtained as desired.

It is also an object of the invention to provide an auxiliary change speed gearing, and a reversible casing carrying the same, the said gearing and casing being adapted to be fitted in place somewhere between the motor and the differential, whereby either a higher speed than the highest speed the vehicle had without the auxiliary gearing, or a lower speed than the lowest speed formerly had by the said vehicle can be obtained, merely by reversing the said casing with the auxiliary change speed gearing therein.

With these and other objects in view, the invention comprises certain novel constructions, combinations, and arrangements of parts, as will be hereinafter more fully described and claimed.

In the accompanying drawing forming a part of this specification:

Figure 1 is a side elevation of a motor vehicle transmission mechanism, showing parts of the vehicle motor and the differential gear broken away.

Fig. 2 is an enlarged central sectional view through the auxiliary change speed mechanism, the parts being located so that a lower speed than the former lowest speed of the vehicle can be had.

Fig. 3 is a similar view, partially in section and partially in elevation, showing the auxiliary change speed element reversed or turned end for end between the former parts that were attached to it.

Fig. 4 is a transverse sectional view taken upon the line 4—4 of Fig. 2.

Fig. 5 is a detail view in side elevation of the auxiliary change speed mechanism applied near the differential mechanism of the vehicle, instead of being applied next to the motor as in Fig. 1.

Fig. 6 is a detail sectional view taken through the lever shift mechanism of the auxiliary change speed device.

In many motor vehicles, change speed mechanisms have been employed of one kind or another, in addition to the regular change speed transmission provided originally with the vehicle. Applicant's invention involves the use of an auxiliary change speed mechanism which as an element in the transmission mechanism of the vehicle, may be reversed in its position to alter its effect upon the speed with which the vehicle can be driven. By setting the said auxiliary gear element between the motor and the differential with one end toward the motor, a higher speed can be obtained than can be had with the transmission with which the vehicle was originally provided. By turning the said auxiliary transmission mechanism end for end, so that the end which was turned toward the differential is turned toward the motor, a lower speed than the original lower speed of the vehicle can be had.

The mechanism is particularly adapted to well known types of reasonable price cars now in common use, and which are provided with a transmission system that is usually susceptible of only two speed changes, one being known as the first or low speed, while the other is known as the high speed or direct drive from the engine. Such a transmission has been commonly used on vehicles known as the Ford type.

The mechanism of the present invention may be applied to the ordinary transmission or power shaft, either between the same and the differential, or between the universal joint next to the engine and the ordinary transmission mechanism and the said power transmission shaft.

The details and features of the invention will now be more specifically described, reference being had to the accompanying drawing, in which 6 indicates an engine of ordinary construction, 7 a change speed transmission mechanism with clutches 8 controlling the same, and 9 a differential mechanism of any usual or ordinary design. In a transmission mechanism of the type illustrated, a clutch controlling lever 10 is usually employed for controlling the clutches, the movement thereof to its extreme position in one direction giving a low speed, and to the other extreme position in the other direction a high speed. By the employment of the present invention, an adjustable speed may be obtained either higher or lower than the ones otherwise possessed through the operation of the clutches 8. In the arrangement shown in Figs. 1 and 2 of the drawing, the auxiliary change speed element is adapted to be inserted between the rear end of the engine shaft 11 and the forward end of the universal joint 12, which is nearly always present in automobile transmission structures. The said change speed element has a casing 13, the ends of which are alike, having outwardly flaring flange portions 14 and 15. The flange 15 is adapted to be bolted to the rear edge of the transmission housing, while the flange 14 overhangs the universal joint 12 and is bolted to a ring 16, which fits around the spherical member 17 of the said universal joint. The said casing can be reversed and bolted in place between the parts just enumerated with equal facility.

In order that the device may be reversed, the gearing within the casing 13 is properly arranged for this purpose. A short shaft 18 is journaled in a suitable bearing or bushing 19, said shaft having a central squared socket 20 let in the end thereof. A longer shaft 21 is journaled in a bearing or bushing 22 in the other end of the casing 13, the said shaft 21 extending toward the short shaft 18, having an internal squared opening running therethrough from end to end. A squared shaft or rod 23 extends through the greater portion of said shaft 21, and projects at one end where it is made cylindrical and extends into cylindrical socket 24 upon the adjacent end of the shaft 18, whereby the two shafts 18 and 21 will be concentric and kept in perfect alinement. The shaft or rod 23 does not extend entirely through the hollow shaft 21, and a short squared shaft 25 is used to couple the said hollow shaft with the engine shaft 11. The hollow shaft 21 thus has a socket in the end of it beyond the portion occupied by the shaft 23, just the same as the short shaft 18 at the other end of the gearing has a socket 20. Either socket therefore, is in readiness to receive either the short coupling shaft 25 or the squared end of the universal coupling member 26, according to which way the gearing is to be mounted.

The short shaft 18 carries a spur gear 27, adapted to mesh with the teeth of a pinion 28 which is secured upon one end of a sleeve 29, mounted in the casing 13. The other end of the said sleeve carries a gear 30, and a short shaft 31 passes through the said sleeve 29 and the gears 28 and 30 on the ends thereof, the ends of said shaft 31 finding bearings at 32 and 33 in the casing, as clearly shown in Fig. 2. A suitable portion of the hollow shaft 21 outside the bearings 22, is formed with grooves and splines 34, upon which slides a pinion 35, the teeth of which may be thus moved to mesh with the teeth of the gear 30 when desired, or may be moved out of mesh with said gear when the drive is not to include the said gears 30 and 28. One face of the gear 35 is provided with clutch projections at 36, which are adapted to mesh or fit between clutch projections 37 of the adjacent face of the gear 27. The structure is thus such that when the pinion 35 is moved so as to bring the said clutch projections into engagement, the motion imparted directly to the hollow shaft 21 from the engine will be communicated directly to the gear 27, the short shaft 18 and the universal joint at 12. When the pinion 35 is moved along the splines of the shaft 21 until it is in mesh with the gear 30, communication will be established from the engine to the universal joint through the pinion 35, gear 30, sleeve shaft 29, pinion 28, gear 27 and short shaft 18. It will be remembered that the hollow shaft 21 runs independently of the gear 27 and the short shaft 18, merely being held in alinement by the cylindrical end of the shaft or bar 23. The pinion 35 is preferably provided with a flanged hub 38, the groove behind the flange thereof being engaged by the bifurcated end 39 of a shift member 40. The shift member 40 is operated by a hand lever 43 pivoted at 41 in an upwardly projecting housing 42 mounted on the open upper side of the casing 13, as indicated in Fig. 1. The lever 43 has its handle end projecting upwardly into the vehicle at any suitable point, whereby it may be readily reached for changing the gearing. The shift member 40 is carried by a sliding shaft 51 having notches in it, adapted to be engaged by a spring pressed ball 52, for holding the shift member in its adjusted positions. The lower end of the lever 43 is rounded and engages a socket 53 in the shift member for moving said member.

When the parts are assembled as shown in Fig. 2 of the drawing, with the shaft 18 receiving the end of the universal joint member 26 in the socket and the coupling 25 engaging the socket 44 in the end of the shaft 21, the change of the gearing making it possible to communicate motion through the universal joint, either at the same speed that is attained by the engine shaft, or at a less speed when the movement is communicated through the gears 30 and 28. By unbolting the casing 13 and sliding the sockets 20 and 44 off from the squared ends of the universal joint member 26 and the coupling shaft 25, the casing 13 with the gearing and shafting therein may be bodily reversed and turned, so that the socket 20 will receive the end of the coupling shaft 25, and the socket 44 will receive the end of the universal joint member 26. The parts will then be assembled in the position shown in Fig. 3 and since the engine will then be capable of driving the larger gear 27 and in mesh with the smaller pinion 28, it will thereby drive the larger gear 30 and communicate an increased speed to the pinion 35. By this arrangement therefore, either the same speed as the engine shaft attains, will be communicated to the universal joint and the driving shaft of the vehicle, or a higher or increased speed through the gearing just enumerated.

It will be observed that the casing 13 and the gearing and shafting mounted therein constitutes a change speed gear element, or unit which can be bodily reversed according to whether the vehicle is to be given a lower speed than it previously had through the transmission 7, or a higher speed than could be obtained through said transmission 7. The only change required is the unbolting of the flanges 14 and 15 of the casing 13 from the transmission casing and the ring 16, and turning the casing around end for end and bolting it in place again, as above described.

It will be readily understood that the gear box 13 may be interposed at any desired point between the casing of the transmission 7 and the casing of the differential 9. Thus as shown in Fig. 1, the gear box can be at the forward end of the drive shaft casing and bolted directly to the casing of the said transmission 7, or the said gear box may be placed at the rear end of the drive or transmission shaft casing, as shown in Fig. 5. In the latter instance, the gear 35 will be shifted by a lever 45, which is connected by a rod 46 with a lever hand 47. The said hand lever 47, is fulcrumed at 48 upon a bracket 49 bolted, or clamped upon the casing 50 of the drive or transmission shaft. Such fulcrum 48 and lever 47 is so located that the upper ends of the lever will occupy about the same position within the motor vehicle as the lever 43 above described. The operation of the gearing will be substantially the same in either arrangement of the device.

It will be understood, of course, that the mechanical details of the invention may be somewhat altered without departing from the spirit of the invention, and that mechanical equivalents may be substituted therefor, if preferred. The operation of the auxiliary change speed device forming the subject matter of this invention is entirely independent of the operation of the main change speed located within the casing of the mechanism 7. The auxiliary mechanism, is therefore, usually set at the desired speed before the operation of the engine, and the main change speed mechanism is begun.

What is claimed is:

1. In combination with two shaft sections arranged in alinement with each other and at a spaced apart, a change speed mechanism adapted to be inserted therebetween and connected with each, said mechanism being adapted to be reversed end for end for changing the speed transmitted from one shaft to the other.

2. In combination with two shaft sections arranged in alinement with each other and at a space apart, a reversible change speed mechanism comprising a casing, parallel shaft elements therein, and gears on said shaft elements within said casing for transmitting power from one shaft to the other, said mechanism being adapted to be reversed end for end between said shaft sections, whereby to change the speed transmitted from one of said shaft sections to the other.

3. In combination with two shaft sections arranged at a space apart, a reversible transmission mechanism interposed therebetween and connected at its opposite ends to the adjacent ends of said shafts, said mechanism being adapted to be turned bodily end for end for changing the speed transmitted from one shaft to the other.

4. An auxiliary speed mechanism for vehicles, comprising a reversible element having independently movable alined shafts formed with coupling sockets in the outer ends thereof, whereby they may be reversed in position between the engine shaft and the power transmission shaft of the vehicle, and intermediate gearing forming a part of said element for communicating the same or different speeds from one alined shaft to the other.

5. An auxiliary change speed mechanism for motor driven devices comprising an intermediate change speed element, having a casing adapted to be reversed in position between the motor and the driven member of the mechanism, said element having also alined independent shafts within the casing formed with coupling sockets in their outer ends, gears upon each of said alined shafts, one of said gears being shiftable upon its shaft, while the other gear is fixed upon its shaft, clutch means between the said gears for causing the alined shafts to move in unison, and intermediate gears adapted to communicate a different speed from one alined shaft to the other when the clutch member is separated, and the movable gear is brought into engagement with the intermediate gears.

6. An auxiliary change speed mechanism for motor driven vehicles, having a reversible element interposed between the motor element and the differential element, said reversible element having a casing adapted to be reversed in position and gearing comprising independently operable alined shafts, the outer ends of which project through the ends of the casing and are provided with coupling sockets, the inner end of one of said shafts having a gear fixed thereon, while the inner end of the other shaft has a splined engagement with a shifting gear, a shifting gear thereon, a counter shaft in said casing parallel with the alined shafts, a sleeve shaft on said counter shaft, gears of different sizes secured to the ends of said sleeve shaft, the gears upon the alined shafts having clutch projections upon their adjacent faces, means for moving the shifting gear upon the splined connection between the alined shafts, whereby the clutch projections on the gears of said shafts may be caused to move in unison, the said slidable gear being also movable to separate the clutch projections and bring its gear teeth into mesh with one of the gears on the counter shaft, whereby a different speed may be imparted from one of the alined shafts to the other, the coupling sockets on the alined shafts being adapted to interchangeably receive a power shaft coupling from the motor, or a universal joint coupling from the transmission shaft of the vehicle, whereby a greater or less speed may be communicated from one alined shaft to the other, according to which couplings the socket members are presenting.

7. An auxiliary speed mechanism for vehicles, comprising a reversible element having independently movable alined shafts formed with coupling members in the outer ends thereof, whereby they may be reversed in position between the engine shaft and the power transmission shaft of the vehicle, and intermediate gearing forming a part of said element for communicating the same or different speeds from one alined shaft to the other.

In testimony whereof, I have hereunto set my hand.

CLINTON C. HAYMOND.